United States Patent [19]

Nakamura et al.

[11] Patent Number: 5,320,914
[45] Date of Patent: Jun. 14, 1994

[54] MAGNETIC RECORDING MEDIUM COMPRISING A STYRENE COPOLYMER OR AN ACRYLIC COPOLYMER

[75] Inventors: Eitaro Nakamura, Tokyo; Fumio Takano, Kawasaki, both of Japan

[73] Assignee: Nippon Zeon Co., Ltd., Tokyo, Japan

[21] Appl. No.: 901,122

[22] Filed: Jun. 19, 1992

[30] Foreign Application Priority Data

Jun. 26, 1991 [JP] Japan ................... 3-181844

[51] Int. Cl.$^5$ ............................. B32B 15/08
[52] U.S. Cl. ............................ 428/694 B; 428/418; 428/424.4; 428/425.9; 428/694 BG; 428/900
[58] Field of Search ................. 428/900, 425.9, 424.4, 428/418, 694 B, 694 BG

[56] References Cited

U.S. PATENT DOCUMENTS

| | | | |
|---|---|---|---|
| 4,076,890 | 2/1978 | Yamada et al. | 428/337 |
| 4,271,234 | 6/1981 | Schönafinger et al. | 428/405 |
| 4,529,649 | 7/1985 | Takeuchi et al. | 428/328 |
| 4,594,174 | 6/1986 | Nakayama et al. | 428/425.9 X |
| 4,707,410 | 11/1987 | Hata et al. | 428/413 |
| 4,707,411 | 11/1987 | Nakayama et al. | 428/425.9 X |
| 4,731,292 | 3/1988 | Sasaki et al. | 428/425.9 |
| 4,842,942 | 6/1989 | Yatsuka et al. | 428/425.9 |
| 4,851,465 | 7/1989 | Yamakawa et al. | 524/431 |
| 4,937,098 | 6/1990 | Nishikawa et al. | 428/694 BGX |
| 4,988,755 | 1/1991 | Dickens, Jr. et al. | 524/401 |
| 5,066,539 | 11/1991 | Inoue et al. | 428/328 |

FOREIGN PATENT DOCUMENTS

| | | |
|---|---|---|
| 58-205929 | 12/1983 | Japan . |
| 1-49426 | 10/1989 | Japan . |
| 2-31319 | 2/1990 | Japan . |

*Primary Examiner*—Paul J. Thibodeau
*Assistant Examiner*—H. Thi Lê
*Attorney, Agent, or Firm*—Frishauf, Holtz, Goodman & Woodward

[57] ABSTRACT

A magnetic recording medium comprises a non-magnetic support on which is coated a magnetic layer. The magnetic layer contains a ferromagnetic powder dispersed in a binder. The binder comprises a styrene copolymer or an acrylic copolymer, respectively containing both of (i) an epoxy group and (ii) at least one hydrophillic group, such as a strong salt group or a tertiary ammonium salt group. The magnetic recording medium exhibits excellent recording density and S/N ratio, causes no environmental pollution, because of the absence of generation of hydrochloric acid on incineration of the magnetic recording medium for disposal after use. The magnetic recording medium is favorably utilized for magnetic tapes, magnetic sheets, magnetic discs and like products.

19 Claims, No Drawings

MAGNETIC RECORDING MEDIUM COMPRISING A STYRENE COPOLYMER OR AN ACRYLIC COPOLYMER

BACKGROUND OF THE INVENTION

1. Field of the Invention

The present invention relates to a novel magnetic recording medium. More particularly, it relates to a magnetic recording medium showing excellent recording density and S/N ratio, causing no environmental pollution because of the absence of generation of hydrochloric acid on incineration for disposal after finishing the use and favorably utilized for magnetic tapes, magnetic sheets, magnetic discs and the like products.

2. Description of the Prior Art

Magnetic recording media are utilized in audio instruments, video instruments, computers and the like instruments and the demand for the magnetic recording media has been growing remarkably. The magnetic recording media generally have a structure comprising a non-magnetic supporter, such as polyester film, and a magnetic layer comprising magnetic powder and a binder and coated on the supporter. The magnetic layer is generally formed by coating or transferring a magnetic coating material comprising the magnetic powder dispersed in a medium containing the binder on the surface of the supporter.

As the binder in the magnetic recording media, organic macromolecular compounds, such as polyester resins, cellulose resins, polyurethane resins, polyvinyl chloride resins, vinyl chloride-vinyl acetate copolymers, vinyl chloride-vinyl acetate-vinyl alcohol copolymers, vinyl chloride-vinylidene chloride copolymers, acrylonitrile-butadiene copolymers, phenolic resins, epoxy resins, polyamide resins, polyvinyl butyral, nitrocellulose, cellulose acetate butyrate, acrylic resins, resins curable by electron beam and the like, are generally utilized.

Each of these binders has its own strong points and weak points. The binders are generally utilized as a combination of two or more kinds because a magnetic layer having a desired property is not usually obtained by a single kind of the binder. For example, a combination of a relatively hard resin, such as a polyvinyl chloride resin, polyvinyl butyral, nitrocellulose and the like, and a relatively soft resin, such as a polyester resin, a polyurethane resin, an acrylonitrile-butadiene copolymer and the like, is widely utilized. A polyisocyanate compound is also widely utilized as a hardening component in the binder for the purpose of increasing durability of the magnetic layer.

The ferromagnetic powder is progressively having a finer structure, a higher magnetic strength and a higher reluctivity in accordance with the requirements to increase the recording density and to improve the S/N ratio of magnetic recording media. The dispersing ability of the binder is, therefore, a very important factor for achieving the improvement of the properties of the magnetic recording media by dispersing the ferromagnetic powder uniformly in the magnetic coating material to form a highly filled magnetic layer having a smooth surface.

A dispersant, such as a low molecular weight surface active agent, is generally added for improving the dispersion of the ferromagnetic powder. When a large amount of the dispersant is used, decrease of durability of the magnetic recording media, soiling of the recording head and other undesirable phenomena take place and the amount of the dispersant is inevitably limited. Thus, the satisfactory dispersion can not be achieved by relying on an added dispersant and it is required that the binder have an intrinsic dispersion ability of a high degree.

It is generally practiced in the field of video magnetic recording tapes that the magnetic layer is crosslinked by compounding a hardening component like a polyisocyanate compound into the magnetic coating material for the purpose of increasing the durability and the reliability of the magnetic recording media. In this method, the binder is required to have reactivity of a suitable degree with the crosslinking agent like a polyisocyanate compound.

As the binder satisfying these conditions, polyvinyl chlorides resins comprising a hydrophillic group containing sulfur or phosphorus, such as a salt type strong acid group and a tertiary ammonium salt group of the formulae: $SO_3M$, $SO_4M$, $PO_4M_2$ and $PO_3M_2$ wherein M is an alkali metal or ammonium group, are widely utilized because of excellent dispersion ability and dispersion stability for the ferromagnetic powder and high strength based on strong intermolecular force.

Along with the growth of usage of the magnetic recording media, the amount of the magnetic recording media which finished its life of service is also increasing. When securing of secret information is considered, incineration is desirable as the method of disposal of such used magnetic recording media. However, when a polyvinyl chloride resin is used as the binder, hydrochloric acid gas is generated during the incineration and acidic mist may be discharged in the air if the incineration furnace is not equipped with an apparatus for discharge gas treatment. Of course, a method like the incineration with addition of lime powder can be adopted but the method has a problem that the amount of ash after the incineration is inevitably increased.

A binder containing no chlorine may be utilized to avoid the generation of hydrochloric acid gas during the incineration. Nitrocellulose resins, acrylate resins and styrene resins have been known as such a binder containing no chlorine. However, nitrocellulose resins are essentially dangerous because of the possibility of denitration and explosion and have insufficient ability as the binder for a magnetic recording media of higher recording density because of high viscosity of the magnetic coating material. It was proposed that the dispersion can be improved by introducing a sulfonic acid (salt) group or phosphoric acid group into acrylic resins or polystyrene resins (Japanese Laid Open Patent Application Showa 57-138050, ibid. Showa 57-138051, ibid. Showa 57-141020, ibid. Showa 58-108032 and Japanese Patent Publication Showa 62-7606). However, a larger alkyl group must be contained in the polymer to improve the dispersion ability by increasing the hydrophobic property of the backbone polymer and this structure brings a lower softening point to cause an unfavorable effect on the running property and the durability of the magnetic recording media. Polystyrene resins have an intrinsic problem that the resins have a weaker intermolecular force than polyvinyl chloride resins and the magnetic layer prepared is more fragile. Various methods have been tried to improve the fragility, such as copolymerization of a monomer containing hydroxyl groups with a styrene monomer, mixing with polyurethane resins and crosslinking by adding a polyisocyanate compound to these materials. Nevertheless, the running property and the durability of the binders based on polystyrene resins still remain inferior to those based on polyvinyl chloride resins.

SUMMARY OF THE INVENTION

The present invention accordingly has an object to provide a magnetic recording medium which does not generate hydrochloric acid gas on the incineration for disposal after finishing the use and has an excellent recording density and S/N ratio by utilizing a binder having excellent dispersing ability for the ferromagnetic powder and useful for attaining high performance of the magnetic recording media.

The present invention has been completed as a result of the extensive investigations undertaken to develop the magnetic recording medium having the desirable properties described above, leading to a discovery that the object described above can be achieved by a recording medium comprising a binder in which the dispersion ability for the ferromagnetic powder is enhanced by introducing a strongly hydrophillic group into the essentially hydrophobic styrene resins or acrylic resins and the durability is enhanced by introducing an epoxy group and that the combined use of a polyurethane resin and/or a polyisocyanate compound with the binder described above is particularly effective for achieving the object. The invention was completed on the basis of the discovery.

Thus, the magnetic recording medium of the invention comprises a magnetic layer coated on a non-magnetic supporter and comprising ferromagnetic powder dispersed in a binder, said binder comprising a styrene copolymer or an acrylic copolymer comprising an epoxy group and at least one of the hydrophillic groups selected from the group consisting of a salt-type strong acid group containing sulfur or phosphorus and a tertiary ammonium salt group. It is preferable that said binder comprises the styrene copolymer or the acrylic copolymer and a polyurethane resin and/or a polyisocyanate compound.

DETAILED DESCRIPTION OF THE INVENTION

The magnetic recording medium of the invention comprises a magnetic layer coated on a non-magnetic supporter and comprising ferromagnetic powder dispersed in a binder. The non-magnetic supporter is not particularly limited but supporters conventionally utilized for magnetic recording media can be utilized. Examples of such non-magnetic supporters are: a film of a polyester, such as polyethylene terephthalate, polyethylene naphthate and the like; polypropylene film; cellulose triacetate film; cellulose diacetate film; polycarbonate film and the like having the thickness in the range from 5 to 50 $\mu$m.

As the binder for the ferromagnetic powder in the invention, a styrene copolymer or an acrylic copolymer comprising an epoxy group and at least one of the hydrophillic groups selected from the group consisting of a salt-type strong acid group containing sulfur or phosphorus and a tertiary ammonium salt group is utilized.

Examples of the salt-type strong acid group containing sulfur or phosphorus are $-SO_3M$, $-SO_4M$, $-PO_4M_2$ and $-PO_3M_2$. Examples of the tertiary ammonium salt are groups having the general formula: $-N^+R_1R_2R_3X^-$ wherein $R_1$, $R_2$ and $R_3$ are an organic group, such as alkyl group, alkenyl group, alkoxy group or aryl group, respectively, and may be groups of the same kind or different kinds and $X^-$ is $Cl^-$, $OH^-$, $SO_3R_4^-$, $-SO_4R_5^-$ or $-PO_4R_6R_7^-$, $R_4$, $R_5$, $R_6$ and $R_7$ being an organic group, respectively.

The styrene copolymer and the acrylic copolymer both comprising the salt-type strong acid group and an epoxy group can be prepared, for example, by the following methods: (1) copolymerization of a monomer having the salt type strong acid group, a monomer having epoxy group and a styrene monomer or an acrylic monomer; (2) addition of a compound having the salt-type strong acid group to a copolymer containing an epoxy group prepared from a monomer having an epoxy group and a styrene monomer or an acrylic monomer; and (3) copolymerization of a monomer having an epoxy group and a styrene monomer or an acrylic monomer by using a radical initiator having the salt-type strong acid group.

Examples of the monomer having the salt-type strong acid group are: alkali metal salts or ammonium salts of organic sulfonic acids, such as vinylsulfonic acid, methylvinylsulfonic acid, (meth)allylsulfonic acid, styrenesulfonic acid, 2-sulfo-ethyl (meth)acrylate, 2-acrylamido-2-methylpropanesulfonic acid, 3-allyloxy-2-hydroxypropanesulfonic acid and the like; alkali metal salts or ammonium salts of organic sulfuric acids, such as 2-hydroxysulfonyloxy-ethyl (meth)acrylate, 3-allyloxy-2-hydroxypropanesulfuric acid and the like; alkali metal salts or ammonium salts of organic phosphoric acids, such as 3-chloro-2-phosphoro-propyl (meth)acrylate, 2-phosphoro-ethyl (meth)acrylate, 3-allyloxy-2-hydroxypropanephosphoric acid and the like; and alkali metal salts or ammonium salts of organic phosphonic acids, such as vinylphosphonic acid, acrylamidomethanephosphonic acid, 2-phosphonoethyl (meth)acrylate, 3-allyloxy-2-hydroxypropanephosphonic acid and the like. Preferable examples are alkali metal salts or ammonium salts of styrenesulfonic acid, 2-acrylamido-2-methylpropanesulfonic acid, 3-allyloxy-2-hydroxypropanesulfonic acid, 3-allyloxy-2-hydroxypropanesulfuric acid and 2-phosphoro-ethyl (meth)acrylate.

Examples of the monomer having an epoxy group utilized in the methods (1), (2) and (3) are: glycidyl ethers of unsaturated alcohols, such as allyl glycidyl ether, methallyl glycidyl ether and the like; glycidyl esters of unsaturated acids, such as glycidyl acrylate, glycidyl methacrylate, glycidyl p-vinylbenzoate, methyl glycidyl itaconate, glycidyl ethyl maleate, glycidyl vinylsulfonate, glycidyl (meth)allylsulfonate and the like; and epoxides of olefins, such as butadiene monooxide, vinylcyclohexene mooxide, 2-methyl-5,6-epoxyhexene and the like. Preferable examples are allyl glycidyl ether and glycidyl methacrylate.

Examples of the styrene monomer utilized in the methods (1), (2) and (3) are: styrene, α-methylstyrene, p-methylstyrene, p-t-butylstyrene and the like. A preferable example is styrene.

Examples of the acrylic monomer utilized in the methods (1), (2) and (3) are (meth)acrylic acid, methyl (meth)acrylate, ethyl (meth)acrylate, n-butyl (meth)acrylate, isobutyl (meth)acrylate, cyclohexyl (meth)acrylate and the like. A preferable example is methyl methacrylate.

Other copolymerizable monomers may be utilized in the methods (1), (2) and (3) according to the necessity. Examples of the copolymerizable monomers are: vinyl esters of carboxylic acids, such as vinyl propionate and the like; vinyl ethers, such as methyl vinyl ether, isobutyl vinyl ether, cetyl vinyl ether and the like; unsaturated carboxylic acids, such as acrylic acid, methacrylic acid, maleic acid, itaconic acid and the like; anhydrides of unsaturated carboxylic acids, such as maleic anhydride, itaconic anhydride and the like; alkyl esters of unsaturated carboxylic acids, such as diethyl maleate, butyl benzyl maleate, di-2-hydroxyethyl maleate, diethyl itaconate, methyl (meth)acrylate, ethyl (meth)acrylate, lauryl (meth)acrylate, 2-hydroxypropyl (meth)acrylate and the like; α-olefins, such as ethylene, propylene and the like; unsaturated alcohols, such as allyl alcohol, 3-butene-1-ol and the like; unsaturated nitriles, such as (meth)acrylonitrile and the like; vinylidene cyanide; and monomers containing hydroxyl group described in the following.

Examples of the monomers containing hydroxyl group are: esters of alkanol having 2 to 8 carbon atoms with α,β-unsaturated acids, such as 2-hydroxyethyl (meth)acrylate, 2-hydroxypropyl (meth)acrylate and the like; esters of polyalkylene glycol with (meth)acrylic acid having the following formula:

wherein m is an integer in the range from 2 to 9, n is an integer in the range from 2 to 4 and R is hydrogen or methyl group; monoesters of dihydroxy ester of dicarboxylic acid with (meth)acrylic acid, such as 2-hydroxyethyl 2'-(meth)acryloyloxy phthalate, 2-hydroxyethyl 2'-(meth)acryloyloxy succinate and the like; (meth)acrylamides, such as N-methylol(meth)acrylamide and the like; alkyleneglycol esters of unsaturated dicarboxylic acids, such as di-2-hydroxyethyl maleate, di-4-hydroxybutyl maleate, di-2-hydroxypropyl itaconate and the like; olfin alcohols, such as 3-butene-1-ol, 5-hexene-1-ol and the like; vinyl ethers, such as 2-hydroxyethyl vinyl ether, 2-hydroxypropyl vinyl ether and the like; mono(meth)allyl ethers of alkylene glycols, such as (meth)allyl 2-hydroxyethyl ether, (meth)allyl 2-hydroxypropyl ether, (meth)allyl 3-hydroxypropyl ether, (meth)allyl 2-hydroxybutyl ether, (meth)allyl 3-hydroxybutyl ether, (meth)allyl 4-hydroxybutyl ether, (meth)allyl 6-hydroxyhexyl ether and the like; mono(meth)allyl ethers of polyoxyalkyleneglycols, such as diethyleneglycol mono(meth)allyl ether, dipropyleneglycol mono(meth)allyl ether and the like; glycerol mono(meth)allyl ether; mono(meth)allyl ethers of halogen derivatives and hydroxyl derivatives of (poly)alkyleneglycols, such as (meth)allyl 2-chloro-3-hydroxypropyl ether, (meth)allyl 2-hydroxy-3-chloropropyl ether and the like; mono(meth)allyl ethers of polyhydric phenols such as eugenol, isoeugenol and the like and halogen derivatives thereof; (meth)allyl thioethers of alkylene glycols, such as (meth)allyl 2-hydroxyethyl thioether and (meth)allyl 2-hydroxypropyl thioether; vinyl alcohol; (meth)allyl alcohol; and the like other compounds.

When the copolymer of the invention is mixed with other resins, it is desired that a homogeneous mixture is prepared. The copolymerizable monomer can be selected suitably according to this purpose and the compatibility and softening points of the copolymer and the other resin can be adjusted.

Among the copolymerizable monomers described above, acrylonitrile is advantageously utilized as the component for enhancing the strength of the magnetic layer by increasing the intermolecular force and also as the component for promoting the solubility with polyurethane resins which are frequently utilized in the binder.

In the method (1), the copolymer to be utilized in the binder can be prepared by copolymerization of the monomer having the salt type strong acid group, the monomer having epoxy group, the styrene monomer or the acrylic monomer and the other copolymerizable monomer utilized according to necessity. The method of copolymerization is not particularly limited but any of the methods such as solution polymerization, suspension polymerization and emulsion polymerization may be adopted.

Examples of the initiator utilized in the copolymerization are: organic peroxides, such as lauroyl peroxide, diisopropyl peroxydicarbonate, di-2-ethylhexyl peroxydicarbonate, t-butyl peroxypivalate, 3,5,5-trimethylhexanoyl peroxide and the like; azo compounds, such as α,α'-azo-bis-isobutyronitrile and the like; ammonium persulfate; potassium persulfate; and the like compounds.

A suspension agent is generally utilized in the suspension polymerization. Examples of the suspension agent are: synthetic macromolecular compounds, such as polyvinyl alcohol, partially saponified polyvinyl acetate, cellulose derivatives like methyl cellulose, polyvinyl pyrrolidone, copolymer of maleic anhydride and vinyl acetate, polyacrylamide and the like; and natural macromolecular compounds, such as starch, gelatin and the like.

An emulsifier is generally utilized in the emulsion polymerization. Examples of the emulsifier are: anionic emulsifiers, such as sodium alkylbenzenesulfonate, sodium laurylsulfate and the like; and nonionic emulsifies, such as polyoxyethylene alkyl ether, partial esters of fatty acids and polyoxyethylene sorbitane and the like.

A molecular weight adjusting agent, such as trichloroethylene, thioglycol, dodecylmercaptane and the like, may be utilized according to necessity.

The polymerization initiator, the monomers, the molecular weight adjusting agent and the suspension agent or the emulsifier may be mixed simultaneously at the start of the polymerization or added in portions at the start of and during the course of the polymerization. The polymerization is conducted generally at the temperature in the range from 35° to 80° C. under stirring.

In the method (2), the monomer having an epoxy group, the styrene monomer or the acrylic monomer and the other copolymerizable monomer which is utilized according to necessity are copolymerized first to prepared the copolymer containing an epoxy group and the compound containing the salt-type strong acid group is added by reaction to the copolymer. Any of the solution polymerization, the suspension polymerization and the emulsion polymerization may be utilized as the method of copolymerization. The most suitable method of copolymerization in accordance with the condition of the addition reaction following the copolymerization or with the characteristics of the copolymer may be selected. For example, when the addition reaction is conducted in an aqueous medium, it is advantageous that copolymer is prepared in the form of finely dispersed particles in water by the emulsion polymerization. When the addition reaction is conducted in an organic solvent, it is advantageous that the copolymerization is conducted by the solution polymerization in the organic solvent or by the suspension polymerization in a lower alcohol such as methanol. The ordinary suspension polymerization may be utilized in this case.

Examples of the compound having hte salt-type strong acid to be added by reaction to the copolymer containing an epoxy group prepared above are: salts of sulfurous acid, such as sodium sulfite, sodium hydrogensulfite, ammonium sulfite, potassium sulfite and the like; salts of hydrogensulfuric acid, such as sodium hydrogensulfate, potassium hydrogensulfate, ammonium hydrogensulfate and the like; salts of hydrogenphosphoric acid, such as dipotassium hydrogenphosphate, disodium hydrogenphosphate and the like; salts of hydrogenphosphorous acid, such as sodium hydrogenphosphite, ammonium hydrogenphosphite and the like; salts of aminosulfonic acid, such as sodium taurin, sodium sulfaminate, potassium sulfanylate and the like; and sodium thiosulfate. A preferable example is sodium hydrogensulfite.

The addition reaction may be conducted either in an aqueous medium or in an non-aqueous medium. The reaction in an aqueous medium or in an organic medium containing water is more advantageous because the compounds having the salt-type strong acid group utilized for the addition reaction are generally soluble in water. The addition reaction is generally conducted by heating at the temperature in the range from 40° to 120° C. for the time in the range from 2 to 24 hours. When the temperature of the reaction is too high, degradation of the copolymer tends to take place.

A catalyst may be utilized in the addition reaction. Examples of the catalyst are: tertiary ammonium salts, such as tetrabutyl ammonium bisulfate, tetrabutyl ammonium bromide, trimethyl lauryl ammonium chloride, benzyl triethyl ammonium chloride and the like; and boron fluorides, such as zinc boron tetrafluoride and the like.

The addition reaction may be effected simultaneously with the copolymerization by adding the required components, such as the compound having the salt-type strong acid group and the catalyst, to the reaction mixture for the copolymerization.

In the method (3), the monomer having an epoxy group, the styrene monomer or the acrylic monomer and the other copolymerizable monomer which is utilized according to necessity are copolymerized by utilizing a radical initiator containing the salt-type strong acid group to prepare the copolymer to be utilized in the binder. Examples of the radical initiator containing the salt-type strong acid group are: ammonium persulfate, potassium persulfate, ammonium perphosphate, sodium perphosphate and the like. A preferable example is potassium persulfate.

The styrene copolymer and the acrylic copolymer both comprising the tertiary ammonium salt group and epoxy group can be prepared, for example, by the following methods: (a) copolymerization of a monomer having the tertiary ammonium salt group, a monomer having an epoxy group and a styrene monomer or an acrylic monomer; and (b) reaction of a compound having the tertiary ammonium salt group to a copolymer containing an epoxy group prepared from a monomer having an epoxy group and a styrene monomer or an acrylic monomer in the presence or absence of an acid.

Examples of the monomer having the tertiary ammonium salt group are: diallyl methyl ammonium chloride, diallyl dimethyl ammonium strearate, 2-hydroxy-3-allyloxypropyl trimethyl ammonium chloride, vinylbenzyl trimethyl ammonium chloride, (meth)acryloyloxyethyl trimethyl ammonium chloride, 2-hydroxy-3-methacryloyloxypropyl trimethyl ammonium chloride, (meth)acryloyloxypropyl dimethyl benzyl ammonium chloride, (meth)acrylaminopropyl trimethyl ammonium chloride and the like. Preferable examples are acryloyloxyethyl trimethyl ammonium chloride and methacryloyloxyethyl trimethyl ammonium chloride.

As the monomer having an epoxy group, the styrene monomer or the acrylic monomer and the other copolymerizable monomer which is utilzed according to necessity, utilized in the methods (a) and (b), the corresponding monomers can be utilized which are described in the method of preparation of the styrene copolymer and the acrylic copolymer both comprising the salt-type strong acid group and epoxy group. The method of polymerization is not particularly limited but the method (1) described above may be utilized.

The styrene copolymer and the acrylic copolymer preferably contain the hydrophillic group which is the salt-type strong acid group or the tertiary ammonium salt group in the amount to make the molecular weight of the copolymer per one hydrophillic group in the range from 4,000 to 40,000, more preferably in the range from 5,000 to 20,000. When the amount of the hydrophillic group is more than the specified range, moisture resistance of the recording medium is decreased and, when the amount of the hydrophillic group is less than the specified range, dispersion of the ferromagnetic powder tends to become poor.

The content of the epoxy group in the copolymer is preferably in the range from 0.5 to 10 weight %, more preferably in the range from 1 to 4. When the content is less than 0.5 weight %, the durability is not sufficient and, when the content is more than 10 weight %, crosslinking proceeds excessively and the recording medium tends to become fragile.

The copolymer has the weight average molecular weight preferably in the range from 10,000 to 100,000, more preferably in the range from 20,000 to 50,000, and the glass transition temperature preferably of 60° C. or above, more preferably in the range from 60° to 100° C. When the weight average molecular weight is less than 10,000, the durability is not sufficient and, when the weight average molecular weight is more than 100,000, the dispersion of the ferromagnetic powder becomes poor because of excessively high viscosity of the magnetic coating material. When the glass transition temperature is below 60° C., the running property of the recording medium at higher temperatures (40° to 50° C.) is inferior. Thus, the conditions outside of the specified ranges are not advantageous.

In the recording medium of the invention, it is preferred that a polyurethane resin and/or a polyisocyanate compound is utilized in the binder in addition to the styrene copolymer or the acrylic copolymer comprising the hydrophillic group and the epoxy group described above.

Examples of the polyurethane resin are polyurethane resins prepared by the reaction of polyisocyanate compounds with polyesterpolyols or polyetherpolyols. Polyurethane resins containing unreacted hydroxyl group and polyurethane resins containing a group of a salt of a sulfonic acid, a group of salt of phosphoric acid or a group of a tertiary ammonium salt including the betain structure are more preferred because dispersion of the ferromagnetic powder becomes improved. Other materials, such as cellulose resins, phenoxy resins, epoxy resins, butyral resins, acrylic resins and acrylonitrile-butadiene rubbers, may be added within the range that the object of the invention can be maintained.

Examples of the polyisocyanate compounds are: tolylene diisocyanate, 4-methoxy-1,3-phenylene diisocyanate, 4-isopropyl-1,3-phenylene diisocyanate, 4-chloro-1,3-phenylene diisocyanate, 4-butoxy-1,3-phenylene diisocyanate, 2,4-diisocyanatodiphenyl ether, mesitylene diisocyanate, 4,4'-methylene-bis-(phenyl isocyanate), durylene diisocyanate, 1,5-naphthalene diisocyanate, benzidine diisocyanate, o-nitrobenzidine diisocyanate, 4,4'-diisocyanatodibenzil, 1,4-tetramethylene diisocyanate, 1,6-hexamethylene diisocyanate, 1,10-decamethylene diisocyanate, 1,4-cyclohexylene diisocyanate, xylylene diisocyanate, 4,4'-methylene-bis-(cyclohexyl isocyanate), 1,5-tetrahydronaphthalene diisocyanate, isophorone diisocyanate, other like diisocyanates and adducts, dimers and trimers of the diisocyanates described here and polyols. Polyurethane resins having 2.3 or more of isocyanate groups in the molecule in average, number average molecular weight in the range from 2,000 to 10,000 and less than 20 weight % of components having molecular weight of 1,000 or less are also examples of the polyisocyanate compounds in the invention. The polyurethane resins having 2.3 or more of isocyanate groups in the molecule in average is particularly preferable because the durability of the recording medium prepared is further enhanced.

Examples of the ferromagnetic powder utilized in the recording medium of the invention are: magnetic powder of metals, such as iron and cobalt; magnetic powder of alloys of iron or cobalt with nickel or other elements comprising iron or cobalt as the major component; $\gamma\text{-Fe}_2\text{O}_3$, $\text{Fe}_3\text{O}_4$, $\gamma\text{-FeO}_x$ ($1.33 < X \leq 1.5$); magnetic powder of these iron oxides comprising impregnated or coated cobalt; magnetic powder of carbonized irons, such as barium ferrite, $\text{Fe}_5\text{C}_2$ and the like; magnetic powder of iron nitrides; magnetic powder of chromium oxides; and the like magnetic powders. Either a single kind of the ferromagnetic powder or a combination of two or more kinds may be utilized. When two or more kinds of the ferromagnetic powder are utilized, the magnetic layers may be coated on the supporter as two or more layers comprising different kinds of the ferromagnetic powder.

The magnetic coating layer is formed on the nonmagnetic supporter by coating with a magnetic coating material which is prepared by dissolving the binder components, such as the styrene copolymer or the acrylic copolymer, the polyurethane resin and the polyisocyanate compound utilized according to necessity and other resins utilized according necessity, in a suitable organic solvent, followed by dispersing the ferromagnetic powder in the solution thus prepared. Examples of the organic solvents utilized herein are: methyl ethyl ketone, methyl n-propyl ketone, methyl isobutyl ketone, diethyl ketone, methyl formate, ethyl formate, propyl formate, methyl acetate, ethyl acetate, butyl acetate, acetone, cyclohexanone, tetrahydrofuran, dioxane, methanol, ethanol, isopropyl alcohol, butanol, methyl cellosolve, butyl cellosolve, cellosolve acetate, dimethyl formamide, dimethyl sulfoxide, pentane, hexane, cyclohexane, heptane, octane, mineral spirit, petroleum ether, gasoline, benzene, toluene, xylene, chloroform, carbon tetrachloride, chlorobenzene, perchloroethylene, trichloroethylene, and the like. Either a single kind of the solvent or a mixture of two or more kinds may be utilized.

The magnetic coating material generally comprises 50 to 90 weight % of the organic solvent, 5 to 20 weight % of the binder and 10 to 50 weight % of the ferromagnetic powder based on the total weight of the coating material. The binder is utilized in the amount in the range from 5 to 25 weight parts, preferably in the range from 7 to 20 weight parts based on 100 weight parts of the ferromagnetic powder. Other generally known ingredients, such as lubricating agents, polishing agents, antistatic agents, crosslinking modifiers, dispersants, pigments, extenders, plasticizers, surface active agents, antioxidants, stabilizers, defoaming agents and the like within the range that the object of the invention is maintained.

Examples of the lubricating agents are: higher fatty acids, higher alcohols, higher fatty acid amides and higher fatty acid esters all having 8 to 18 carbon atoms, such as lauric acid, myristic acid, palmitic acid, stearic acid, oleic acid, linoleic acid, stearolyic acid, stearyl alcohol, palmityl alcohol, laurylamide, dimethyl stearylamide, butyl laurylamide, butyl stearate, octyl stearate and the like; silicone oils; fluorine-containing oils, such as polyperfluoroalkylene oxide, perfluoroalkane and the like; paraffin wax; oxidized polyethylene; solid lubricating agents, such as carbon black, graphite, molybdenum disulfide, tungsten disulfide and the like; and the like other lubricating agents. The lubricating agent is generally utilized in the amount in the range from 1 to 6 weight parts per 100 weight parts of the ferromagnetic powder.

As the polishing agents, alumina, silicone carbide, chromium oxide corundum are generally utilized. As the antistatic agent, conductive powders, such as graphite, carbon black and the like, and antistatic agents based on surface active agents, such as nonionic surface active agents like polyalkylene oxide, cationic surface active agents like tertiary ammonium salts are utilized.

The reason that the recording medium of the invention exhibits excellent durability is not yet fully elucidated but it is considered to originate from partial dissociation of hydrophillic groups in the binder by the action of moisture bound on the surface of the ferromagnetic powder or present in the atmosphere during the production processes and resultant crosslinking reaction with the epoxy group in the molecule.

The crosslinking modifier promotes the crosslinking reaction described above. Examples of the crosslinking modifier are: (1) acidic esters of phosphoric acid, (2) acidic esters of sulfuric acid, (3) carboxylic acids, (4) polythiol compounds and (5) aminosilane compounds.

(1) The acidic ester of phosphoric acid utilized as the crosslinking modifier is, for example, a compound having the formula:

$$(R_8O)_m PO(OH)_{3-m} \qquad [1]$$

$$[R_8O(A_1O)_n]_m PO(OH)_{3-m} \qquad [2]$$

or $$[R_8COO(A_1O)_n]_m PO(OH)_{3-m} \qquad [3]$$

wherein $R_8$ is an alkyl group or an alkenyl group having 1 to 22 carbon atoms, phenyl group, an alkylphenyl group or an alkenylpheyl group, $A_1$ is an alkylene group having 2 to 4 carbon atoms, m is an integer in the range from 1 to 3 and n is an integer in the range from 1 to 30.

The compound having the formula [1] is a monoester, a diester, a sesquiester or a triester of phosphoric acid derived from phosphoric acid and an alkanol or an alkenol having 1 to 22 carbon atoms, phenol, an alkylphenol or an alkenylphenol. Examples of the such compound are monododecyl phosphate, sesquidodecyl phosphate, dinonyl phenyl phosphate and the like.

The compound having the formula [2] is a monoester, a diester, a sesquiester or a triester of phosphoric acid derived from phosphoric acid and an adduct of a lower alkylene oxide with an alkanol or an alkenol having 1 to 22 carbon atoms, phenol, an alkylphenol or an alkenylphenol. Examples of such compound are sesquidodecyl polyoxyethylene (n=3) phosphate, dinonyl phenyl polyoxyethylene (n=4) phosphate, trioleyl polyoxyethylene (n=4) phosphate and the like.

The compound having the formula [3] is a monoester, a diester, a sesquiester or a diester of phosphoric acid derived from phosphoric acid and an adduct of a lower alkylene oxide with a fatty acid having 2 to 23 carbon atoms. Examples of such compounds are;

$[C_{17}H_{35}COO(CH_2CH_2O)_{15}PO(OH)_2]$, $[CH_2=C(CH_3)COO(CH_2CH_2O)]_{1.5}PO(OH)_{1.5}$ and the like.

(2) The acidic monoester of sulfuric acid utilized as the crosslinking modifier is, for example, a compound having the following formula:

$R_9OSO_2OH$          [4]

$R_9O(A_2O)_kSO_2OH$          [5]

or $R_9COO(A_2O)_kSO_2OH$          [6]

wherein $R_9$ is an alkyl group or an alkenyl group having 1 to 22 carbon atoms, phenyl group, an alkylphenyl group or an alkenylphenyl group, $A_2$ is an alkylene group having 2 to 4 carbon atoms and k is an integer in the range from 1 to 30.

The compound having the formula [4] is a monoester of sulfuric acid derived from sulfuric acid and an alkanol or an alkenol having 1 to 22 carbon atoms, phenol, an alkylphenol or an alkenylphenol. Examples of such a compound are butyl sulfuric acid monoester, oleyl sulfuric acid monoester and the like.

The compound having the formula [5] is a monoester of sulfuric acid derived from sulfuric acid and an adduct of a lower alkylene oxide with an alkanol or an alkenol having 1 to 22 carbon atoms, phenol, an alkylphenol or an alkenylphenol. Examples of such a compound are: polyoxyethylene (k=4) dodecyl ether sulfuric acid monoester, polyoxypropylene (k=6) nonylphenyl ether sulfuric acid monoester and the like.

The compound having the formula [6] is a monoester of sulfuric acid derived from sulfuric acid and a lower alkylene oxide ester of a fatty acid having 2 to 23 carbon atoms. Examples of such a compound are:

$C_5H_{11}COO(CH_2CH_2O)_2SO_2OH$, $CH_2=C(CH_3)COO(CH_2CH_2O)SO_2OH$ and the like.

(3) The carboxylic acid utilized as the crosslinking modifier is a saturated or unsaturated aliphatic monofunctional carboxylic acid, a saturated or unsaturated polyfunctional carboxylic acid, an aromatic monofunctional carboxylic acid or an aromatic polyfunctional carboxylic acid. Examples of the carboxylic acid utilized as the crosslinking modifier are: formic acid, monochloroacetic acid, dichloroacetic acid, trichloroacetic acid, α-chlorolactic acid, monofluoroacetic acid, monobromoacetic acid, monoiodoacetic acid, p-nitrobenzoic acid, m-nitrobenzoic acid, o-nitrobenzoic acid, m-chlorobenzoic acid, o-chlorobenzoic acid, o-toluic acid, 3,5-dinitrobenzoic acid, salicylic acid, oxalic acid, malonic acid, maleic acid, fumaric acid, phthalic acid, isophthalic acid, terephthalic acid, hemimellitic acid, trimellitic acid, trimesic acid, prehnitic acid, mellophanic acid, pyromellitic acid, benzene pentacarboxylic acid, mellitic acid, phenylpropionic acid, o-phenylenediacetic acid, glyoxylic acid, pyruvic acid, acetoacetic acid, glycolic acid, (±)-lactic acid, (±)mandelic acid, (−)-malic acid, (±)-malic acid, (+)-oxalic acid, (−)-oxalic acid, (±)-oxalic acid, meso-oxalic acid, citric acid and the like.

As (4) the polythiol compound utilized as the crosslinking modifier, a triazinethiol or a monoalkalimetal salt of a triazinethiol having the following formula is preferably utilized:

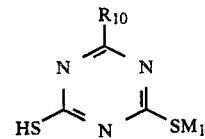

[7]

wherein $R_{10}$ is a substituent and $M_1$ is hydrogen or an alkali metal. Examples of the substituent $R_{10}$ are —SH, —N(CH$_3$)$_2$, —NHC$_6$H$_5$, —N(C$_4$H$_9$)$_2$, —N(C$_8$H$_{17}$)$_2$, —N(C$_{12}$H$_{26}$)$_2$, —N(CH$_2$CH=CH$_2$)$_2$, —NHC$_8$H$_{18}$CH=CHC$_8$H$_{17}$ and the like.

Examples of (5) the aminosilane compound utilized as the crosslinking modifier are: N-(2-aminoethyl)-3-aminopropylmethyldimethoxysilane, N-(2-aminoethyl)-3-aminopropylmethoxysilane, p-[N-(2-aminoethyl)]aminomethylphenethyltrimethoxysilane, 1-(3-aminopropyl)-1,1,3,3,3-pentamethyldisiloxane, 3-aminopropyltriethoxysilane, 3-aminopropyl-tris-(trimethylsiloxy)silane, 3-[N-allyl-N-(2-aminoethyl)]aminopropyltrimethoxysilane, N-[3-(trimethoxysilyl)propyl]diethylenetriamine, N-[3-(trimethoxysilyl)propyl]triethylenetetramine, 3-trimethoxysilylpropyl-m-phenylenediamine, 1,3-bis(3-aminopropyl)-1,1,3,3-tetramethyldisiloxane, α,ω-bis-(3-aminopropyl)polydimethylsiloxane, N,N-bis-[(methyldimethoxysilyl)propyl]amine, N,N-bis-[3-(methyldimethoxysilyl)propyl]ethylenediamine, N,N-bis-[3-(trimethoxysilyl)propyl]amine, N,N-bis-[3-(trimethoxysilyl)propyl]ethylenediamine, hexamethyldisilazane and the like.

Among the crosslinking modifiers described above, polyoxyethylene alkyl ether acid phosphate and aminosilane compounds are effective as a viscosity modifier of the magnetic coating material as well.

The method of preparation of the magnetic coating material is not particularly limited but conventional methods for preparation of magnetic coating materials may be utilized. For example, the magnetic coating material can be prepared by mixing the dispersion homogeneously with a ball mill, a mixer, a roll mill, a beads mill, a gravel mill, a sand mill or a high speed impeller while the components of the coating material are simultaneously or successively added. The condition of the mixing is different depending on kind and size of the ferromagnetic powder utilized and application of the coating material. The mixing is generally conducted at the temperature in the range from the room temperature to 100° C. for the time in the range from 5 minutes to 20 hours.

The magnetic layer in the magnetic recording medium of the invention can be prepared by coating the magnetic coating material prepared above on at least one of the surfaces of the non-magnetic supporter so as to make the thickness of the dried coating layer generally in the range from 0.5 to 20 μm by a suitable method, followed by drying the coated material. Alternatively, the coating material can be coated on a base sheet such as release paper and dried to form a magnetic layer and then the magnetic layer can be transferred to the surface of the non-magnetic supporter. As methods of coating, drying and transfer, conventional methods can be utilized.

DESCRIPTION OF THE PREFERRED EMBODIMENTS

The invention will be understood more readily with reference to the following examples; however, these examples are intended to illustrate the invention and are not to be construed to limit the scope of the invention.

Evaluation of the magnetic coating material was conducted according to the following methods.

(1) Gloss

A magnetic coating material was coated on a polyester film to form a coating layer having thickness of 4 μm, treated with magnetic polarization and dried. Gloss of the surface of the coating layer was evaluated by measuring reflectivity by a glossmeter at the angle of incidence of 60° and the angle of reflection of 60°.

(2) Dispersion stability

The same coating material as in the evaluation of gloss was left standing for 6 hours and then coated on the polyester film to form a coating layer having thickness of 4 μm, treated with magnetic polarization and dried. Reflectivity of the surface of the coating layer was measured by a glossmeter at the angle of reflection of 60°. The measured reflectivity was compared with the original reflectivity measured in (1) and the dispersion stability was evaluated from the fraction of holding the original reflectivity.

(3) Rectangular ratio (Br/Bm)

The ratio was measured by an apparatus for measuring magnetic properties on a sample of 12.5 mm×50 mm cut out from the magnetic coating layer used for the evaluation of gloss.

(4) Durability

The same magnetic coating layer as in the evaluation of gloss was treated for smoothing by a calender roll and heat treated at 65° C. for 65 hours. The heat treated coating layer was cut into a strip of width of 12.5 mm. A drum having polishing paper on the surface was pressed against the strip of the coating layer by the weight of 100 g and rotated at 150 rpm for 30 minutes. The condition of the surface of the polishing paper was evaluated by visual observation and classified into the following three grades:

A: no adhesion of the coating material
B: slight adhesion of the coating material
C: remarkable adhesion of the coating material (5) Resistance against solvent The same magnetic coating layer as in the evaluation of gloss was cut into strips of width of 12.5 mm and length of 50 mm. Twenty strips prepared herein was placed in a 150 ml capped glass bottle containing 100 ml of tetrahydrofuran and treated with ultrasonic wave at 50° C. for 1 hour. The condition of the coating layer and the condition of tetrahydrofuran were visually observed and classified into the following three grades.

A: no deformation of the coating layer and no fouling of the solvent
B: the coating layer kept at the surface of the support but fouling of the solvent observed
C: the coating layer removed from the surface and fouling of the solvent remarkable (6) Amount of hydrochloric acid generated during incineration A sample of 3 mm×3 mm was cut out from the same magnetic coating layer as in the evaluation of gloss and the amount of hydrochloric acid in the incineration gas was measured according to the method of Japanese Industrial Standard K-7217 as following. Hydrochloric acid gas formed by the incineration of the sample in the air was absorbed by an aqueous solution of sodium hydroxide. The amount of chlorine ion in the solution was determined quantitatively by the silver nitrate/ammonium ferric sulfate/ammonium thiocyanate method. A sample of polyester film having no magnetic coating layer was used as the control sample in the measurement.

Example of preparation of material 1

Into a vessel for polymerization equipped with a stirrer, 20 weight parts of styrene, 10 weight parts of acrylonitrile, 15 weight parts of allyl glycidyl ether, 1 weight part of 2-hydroxypropyl methacrylate, 2 weight parts of sodium lauryl sulfate, 1 weight part of sodium hydrogen carbonate, 4 weight parts of potassium persulfate and 200 weight parts of deionized water were charged and the mixture was degassed in vacuo. Polymerization was started by heating the mixture to 80° C. Starting immediate after the start of the polymerization, a mixture of 36 weight parts of styrene, 15 weight parts of acrylonitrile and 4 weight parts of 2-hydroxypropyl methacrylate was added to the reaction vessel continuously during 8 hours.

Conversion of the polymerization reached 96% after 10 hours and the reaction mixture was cooled to obtain an aqueous dispersion of the reaction product. To the aqueous dispersion, 10 weight parts of methyl ethyl ketone were added and the mixture was frozen at −30° C. The resin was recovered by thawing of the mixture, washed with water and dried to obtain the resin A.

The resin A thus prepared contained 3.2 weight % of epoxy group, 0.4 weight % of hydroxyl group and 58 weight % of styrene unit and had the bound acid group calculated as $SO_4$ group of 0.8 weight %, the weight average molecular weight of 30,100, the molecular weight per one bound acid group of 12,000 and the glass transition temperature of 76° C.

Example of preparation of material 2

Into a vessel for polymerization, 30 weight parts of styrene, 20 weight parts of acrylonitrile, 5 weight parts of sodium styrenesulfonate, 30 weight parts of methyl methacrylate, 15 weight parts of glycidyl methacrylate, 0.5 weight parts of sodium hydrogen carbonate, 1 weight part of sodium sulfite, 0.1 weight parts of hydroxypropyl cellulose, 0.5 weight parts of polyoxyethylene lauryl ether, 2 weight parts of azo-bis-isobutyronitrile, 200 weight parts of methanol and 20 weight parts of water were charged and the mixture was degassed in vacuo. Polymerization was started by heating to 60° C. and finished after 5 hours by cooling. The reaction mixture was poured into water of 10 times quantity, filtered, washed and dried to obtain the resin B.

The resin B thus prepared contained 2.8 weight % of epoxy group, and 62 weight % of the total of the styrene unit and the methyl methacrylate unit and had the bound acid group calculated as $SO_4$ group of 1.0 weight %, the weight average molecular weight of 19,000, the molecular weight per one bound acid group of 9,600 and the glass transition temperature of 79° C.

Example of preparation of material 3

Into a vessel for polymerization, 20 weight parts of styrene, 10 weight parts of acrylonitrile, 12 weight parts of allyl glycidyl ether, 1 weight part of 2-hydroxypropyl methacrylate, 0.1 weight parts of methyl cellulose, 3 weight parts of azo-bis-isobutyronitrile and 200 weight parts of deionized water were charged and the mixture was degassed in vacuo under stirring. Polymerization was started by heating to 80° C. Starting immediately after the start of the polymerization, a mixture of 36 weight parts of styrene, 18 weight parts of acrylonitrile and 4 weight parts of 2-hydroxypropyl methacrylate was added to the reaction mixture continuously during 4 hours. Four and a half hours after the start of the polymerization, 4 weight parts of N,N-dimethylstearylamine and 2 weight parts of lactic acid were added to the reaction mixture and the mixture was stirred at 90° C. for further 1 hour. Then, the reaction mixture was cooled and water in the mixture was removed. The product was washed and dried to obtain the resin C.

The resin C contained 1.5 weight % of epoxy group, 0.6 weight % of hydroxyl group and 56 weight % of styrene unit and had the bound tertiary ammonium salt group calculated as dimethylstearylamino group of 2.8 weight %, the weight average molecular weight of 42,000, the molecular weight per one bound tertiary ammonium salt group of 10,400 and the glass transition temperature of 76° C.

Example of preparation of material 4

By the similar process as in Example of preparation of material 2 except that disodium salt of 2-phosphoro-ethyl methacrylate was used in place of sodium styrenesulfonic acid in Example of preparation of material 2, the resin D was prepared.

The resin D contained 2.7 weight % of epoxy group and 63 weight % of the total of the styrene unit and the methyl methacrylate unit and had the bound acid group calculated as $PO_4$ group of 1.4 weight %, the weight average molecular weight of 21,000, the molecular weight per one bound acid group of 6,800 and the glass transition temperature of 77° C.

Example of preparation of material 5

By the similar process as in Example of preparation of material 2 except that cyclohexyl methacrylate was used in place of styrene in Example of preparation of material 2, the resin B' was prepared.

The resin B' contained 2.9 weight % of epoxy group and 61 weight % of the total of the cyclohexyl methacrylate unit and the methyl methacrylate unit and had the bound acid group calculated as $SO_4$ group of 1.0 weight %, the weight average molecular weight of 21,000, the molecular weight per one bound acid group of 9,000 and the glass transition temperature of 67° C.

Example of preparation of material 6

By the similar process as in Example of preparation of material 2 except that styrene was used in place of sodium styrenesulfonic acid in Example of preparation of material 2, the resin E was prepared.

The resin E contained 3.0 weight % of epoxy group and 66 weight % of the total of the styrene unit and the methyl methacrylate unit and had no bound acid group, the weight average molecular weight of 29,000 and the glass transition temperature of 80° C.

Example of preparation of material 7

By the similar process as in Example of preparation of material 2 except that methyl methacrylate was used in place of glycidyl methacrylate in Example of preparation of material 2, the resin F was prepared.

The resin F contained 31 weight % of styrene and had the bound acid group calculated as $SO_4$ group of 1.0 weight %, the weight average molecular weight of 17,000, the molecular weight per one bound acid group of 9,600 and the glass transition temperature of 81° C.

Example of preparation of material 8

Into a vessel for polymerization, 75 weight parts of methyl methacrylate, 20 weight parts of butyl acrylate, 5 weight parts of 2-phosphoro-ethyl methacrylate, 0.6 weight parts of azo-bis-isobutyronitrile, 75 weight parts of toluene and 75 weight parts of methyl isobutyl ketone were charged and the air in the vessel was replaced with nitrogen. After the polymerization at 80° C. for 8 hours, the solution of copolymer prepared was dried to obtain the resin G.

The resin G was purified by reprecipitation and analyzed. The resin G had the bound acid group calculated as $PO_4$ group of 1.8 weight %, the weight average molecular weight of 19,000, the molecular weight per one bound acid group of 5,300 and the glass transition temperature of 70° C.

EXAMPLES 1 THROUGH 7 AND COMPARATIVE EXAMPLES 1 THROUGH 4

A mixture containing 100 weight parts of ferromagnetic powder coated with cobalt having a specific surface area of 42 $m^2/g$, 10 weight parts of a hard binder shown in Table 1, 10 weight parts of a polyurethane resin shown in Table 1, 150 weight parts of a mixed solvent containing methyl ethyl ketone, cyclohexanone and toluene in the weight ratio of 1:1:1, 2 weight parts of carbon black, 4 weight parts of alumina, 2 weight parts of myristic acid and 1 weight part of butyl stearate was dispersed at high speed in a sand mill for 90 minutes. To the dispersed mixture, 60 weight parts of the mixed solvent and 13 weight parts of a polyisocyanate shown in Table 1 were added. After the mixture was dispersed for further 15 minutes, 7 weight parts of a crosslinking modifier shown in Table 1 were added and dispersed for further 5 minutes. The magnetic coating material thus prepared was evaluated. The results of the evaluation shown in Table 1 clearly demonstrate the advantage of the recording media of the invention.

TABLE 1

| | (Part 1) | | | | | | |
|---|---|---|---|---|---|---|---|
| Example | 1 | 2 | 3 | 4 | 5 | 6 | 7 |
| Component of magnetic coating material | | | | | | | |
| hard binder[1,2)] | A | A | B | B | C | D | B' |
| polyurethane) | H | M | H | H | H | H | H |

TABLE 1-continued

| resin[3,4] | | | | | | | |
|---|---|---|---|---|---|---|---|
| polyisocyanate compound[4,5] | L | M | L | L | L | L | L |
| crosslinking modifier[6,7,8] | a | — | a | b | c | a | a |
| Result of evaluation | | | | | | | |
| gloss (%) | 6110 | 121 | 110 | 110 | 105 | 105 | 107 |
| dispersion stability (%) | 93 | 99 | 96 | 95 | 96 | 93 | 95 |
| rectangular ratio | 0.83 | 0.88 | 0.84 | 0.84 | 0.82 | 0.81 | 0.84 |
| durability | A | A | A | A | A | A | A |
| resistance against solvent | A | A | A | A | A | A | A |
| amount of generated hydrochloric acid[9] (mg/g) | ND | ND | ND | ND | ND | ND | ND |

(Part 2)

| Comparative example | 1 | 2 | 3 | 4 |
|---|---|---|---|---|
| Component of magnetic coating material | | | | |
| hard binder[1,2] | E | F | G | MR-110 |
| polyurethane resin[3,4] | H | H | H | H |
| polyisocyanate compound[4,5] | L | L | L | L |
| crosslinking modifier[6,7,8] | a | a | a | a |
| Result of evaluation | | | | |
| gloss (%) | 10) | 110 | 71 | 110 |
| dispersion stability (%) | 10) | 91 | 60 | 95 |
| rectangular ratio | 10) | 0.82 | 0.72 | 0.84 |
| durability | 10) | C | B | A |
| resistance against solvent | 10) | C | C | A |
| amount of generated hydrochloric acid[9] (mg/g) | 10) | ND | ND | 0.060 |

[1] MR-110 ®: a product of Japan Zeon Co., Ltd, a binder of polyvinyl chloride.
[2] A~G: resins prepared in Examples of preparation of material 1~8.
[3] H: a polyurethane resin of 1,4-butanediol adipate - MDI, molecular weight 70,000, content of hydroxyl group 0.3 weight %.
[4] M: polyurethane of terminal isocyanate type, number average molecular weight 4,000, number of NCO per molecule 2.8.
[5] L: a product of Nippon Polyurethane Co., Ltd., an adduct of trimethylolpropane and TDI.
[6] a: a product of Toho Kagaku Co., Ltd., polyocyethylene nonylphenyl acid phosphate.
[7] b: N,N-dibutylaminothiol-S-triazine.
[8] c: γ-aminopropylethoxysilane.
[9] ND: 0.010 mg/g or less.
[10] evaluation not possible because of poor dispersion.

While the invention has been particularly shown and described with reference to preferred embodiments thereof, it will be understood by those skilled in the art that the foregoing and other changes in form and details can be made therein without departing from the spirit and scope of the invention.

To summarize the advantages obtained by the invention, the recording medium does not generate hydrochloric acid gas on incineration for disposal and does not cause environmental pollution. At the same time, a magnetic layer can be formed in which ferromagnetic powders are polarized and filled with a density in the same level as that of the magnetic layer utilizing conventional polyvinyl chloride binders and the recording medium prepared has excellent S/N ratio, durability and running property.

What is claimed is:

1. A magnetic recording medium comprising a non-magnetic support on which is coated a magnetic layer, the magnetic layer comprising ferromagnetic powder dispersed in a binder, said binder comprising a styrene copolymer or an acrylic copolymer, said copolymer having a glass transition temperature of 60° to 100° C., said binder containing both of (i) an epoxy group and (ii) at least one hydrophillic group selected from the group consisting of a strong acid salt group containing sulfur or phosphorus and a tertiary ammonium salt group, said magnetic recording medium when incinerated does not generate hydrochloric acid gas.

2. The magnetic recording medium according to claim 1, wherein the epoxy group is in an amount in the copolymer of 0.5 to 10 weight %.

3. The magnetic recording medium according to claim 1, wherein epoxy group is in an amount in the copolymer of 1 to 4 weight %.

4. The magnetic recording medium according to claim 3, wherein the copolymer contains the hydrophillic group in an amount sufficient to make the molecular weight of the copolymer per one hydrophillic group from 5,000 to 20,000.

5. The magnetic recording medium according to claim 4, wherein the copolymer has a weight average molecular weight from 20,000 to 50,000.

6. The magnetic recording medium according to claim 3, wherein the copolymer has a weight average molecular weight from 20,000 to 50,000.

7. The magnetic recording medium according to claim 3, wherein the non-magnetic support has a thickness of 5 to 50 μm and is selected from the group consisting of polyethylene terephthalate, polyethylene naphthate, polypropylene film, cellulose triacetate film, cellulose diacetate film and parcarbonate film.

8. The magnetic recording medium according to claim 7, wherein the copolymer contains the hydrophilic group in an amount sufficient to make the molecular weight of the copolymer per one hydrophillic group from 5,000 to 20,000; the copolymer has a weight average molecular weight of 20,000 to 50,000.

9. The magnetic recording medium according to claim 8, wherein the magnetic layer comprises 50 to 90 weight % of an organic solvent, 5 to 20 weight % of the binder and 10 to 50 weight % of the ferromagnetic powder.

10. The magnetic recording medium according to claim 1, wherein the copolymer contains the hydrophillic group in an amount sufficient to make the molecular weight of the copolymer per one hydrophillic group from 4,000 to 40,000.

11. The magnetic recording medium according to claim 1, wherein the copolymer contains the hydrophillic group in an amount sufficient to make the molecular weight of the copolymer per one hydrophillic group from 5,000 to 20,000.

12. The magnetic recording medium according to claim 1, wherein the copolymer has a weight average molecular weight of 10,000 to 100,000.

13. The magnetic recording medium according to claim 1, wherein the copolymer has a weight average molecular weight from 20,000 to 50,000.

14. The magnetic recording according to claim 1, wherein the binder comprises a styrene copolymer.

15. The magnetic recording medium according to claim 1, wherein the binder comprises an acrylic copolymer, which is a methylmethacrylate copolymer.

16. The magnetic recording medium according to claim 1, wherein the strong acid salt group is —$SO_3M$, —$SO_4M$, —$PO_4M_2$ or —$PO_3M_2$.

17. The magnetic recording medium according to claim 1, wherein the strong acid salt group is —$SO_3M$ or —$SO_4M$.

18. The magnetic recording medium according to claim 1, wherein the binder further comprises a resin selected from the group consisting of a polyurethane resin and a polyisocyanate compound.

19. The magnetic recording medium according to claim 18, wherein the polyurethane resin has 2.3 or more of isocyanate groups in the molecule in average.

* * * * *